May 19, 1959 H. W. GATES 2,887,663
FREQUENCY MODULATING SYSTEM
Filed March 25, 1954
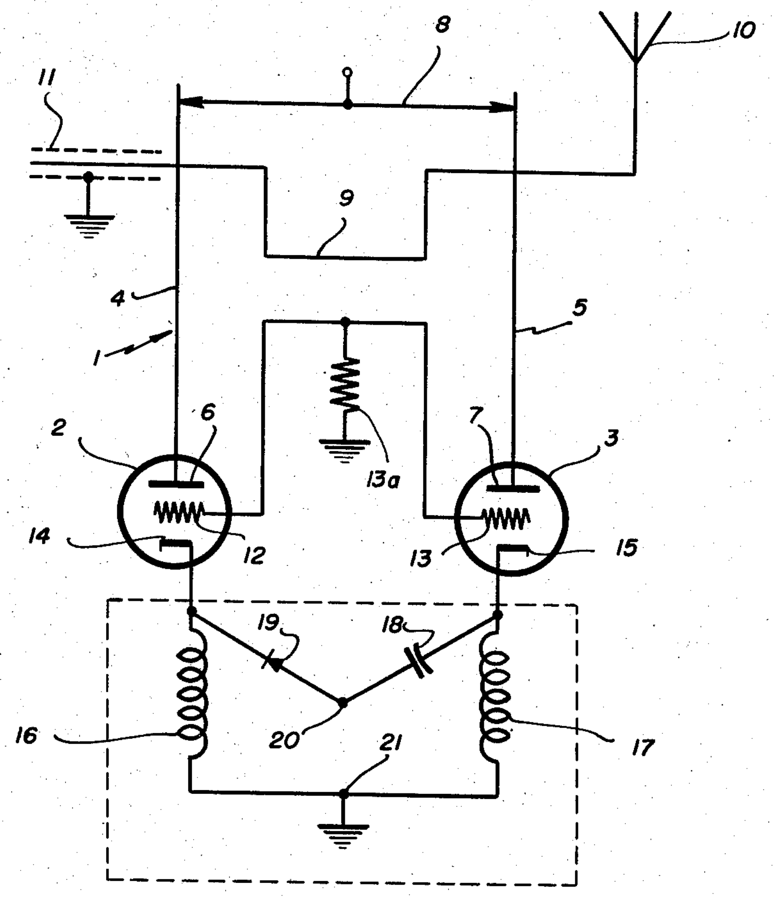
INVENTOR.
HARRY W. GATES
BY Lockwood, Galt, Woodard & Smith
ATTORNEYS 2,887,663

FREQUENCY MODULATING SYSTEM

Harry W. Gates, Fort Wayne, Ind., assignor to International Telephone and Telegraph Corporation Application March 25, 1954, Serial No. 418,578

3 Claims. (Cl. 332—24)

The present invention relates to a frequency modulating system, and more particularly to a system for providing frequency modulated signals in the ultra-high frequency spectrum.

It is customary practice, in generating frequency modulated signals in the ultra-high frequency spectrum, to utilize a low frequency, frequency modulated system which is designed to multiply both the center and deviation frequencies until the desired ultra-high operating frequency is achieved. Such systems are obviously complicated in that a number of separate costly frequency-multiplying circuits are required. Further disadvantage is found in inadequate operating reliability.

In prior art signal-generating systems wherein the fundamental frequency is located in the ultra-high frequency spectrum, efforts to frequency modulate directly at this frequency have resulted in appreciable loss of output power.

It is an object of this invention, in view of the foregoing, to provide a frequency modulated system for use in the ultra-high frequency spectrum which is simple in design and which is reliable and efficient in operation.

It is another object to provide an arrangement for frequency modulating a signal-generating device operating directly (without multiplication of a lower frequency signal) in the ultra-high frequency range.

It is yet another object of this invention to provide a simple means of obtaining wide deviation frequency modulation with satisfactory fidelity from an oscillator operating at relatively high frequencies.

In accordance with the provisions of this invention, a frequency modulating system is provided which comprises an oscillation generator having the usual regenerative circuit which serves to determine the frequency of oscillation, and a frequency-deviating network operatively coupled into said regenerative circuit, this network incorporating signal input means and automatically variable impedance means of such a nature that a modulating signal of predetermined amplitude which is coupled to said variable impedance means and also to said regenerative circuit serves to control the frequency of oscillation of the oscillation generator.

For a better understanding of this invention, together with other and further objects thereof, reference is made to the following description and accompanying drawing, the scope of the invention being defined by the appended claims.

The drawing is a circuit diagram of one embodiment of this invention.

With reference to this drawing, a conventional tuned plate, tuned grid, push-pull, parallel line oscillator, indicated generally by the reference numeral 1, is comprised of two triodes 2 and 3 in a suitable regenerative circuit. This regenerative circuit includes two, parallel anode tuning lines 4 and 5, respectively connected tube anodes 6 and 7, a shorting bar 8 for adjusting the oscillator frequency, and a conventional antenna coupling loop 9 operatively coupled into this anode circuit 4, 5 for delivering oscillator power to the antenna 10. Suitable matching of the antenna to the oscillator circuitry is achieved through the use of a suitable coaxial stub 11 which is grounded as shown.

The control grids 12 and 13 are connected together by a grid to plate coupling loop and grounded at the center through the usual biasing resistor 13*a*.

That portion of the circuit just described is conventional and is not critical insofar as this invention is concerned, and its design may vary in accordance with operating requirements. The remainder of the circuit, however, constitutes an exemplification of this invention and will now be described in detail.

The cathodes 14 and 15 of the two tubes 2 and 3, respectively, are connected to ground through two suitable inductors or chokes 16 and 17, respectively. Between the two cathodes is coupled a frequency-deviating network comprised of a condenser 18 and a crystal diode 19, these components being series connected. The modulating-input terminals are indicated by the reference numerals 20 and 21 respectively, terminal 20 being connected to the junction of the diode 19 and the condenser 18 and the terminal 21 being grounded.

In understanding the operation of this invention the circuit should be first considered without the frequency-deviating network 18 and 19. The oscillator 1 will now have a certain fixed frequency of oscillation, and if the components are properly selected, such frequency may be set at, for example, 400 mc. Now if a small condenser of, say, 1 mmf. in value is bridged between the two cathodes 14 and 15, the oscillator will function at some different frequency, the variation resulting being dependent upon the change in impedance in the cathode circuit caused by the insertion of this condenser. Now if a simple, non-reactive resistor is inserted in series with this condenser (the resistor being substituted for the diode 19 in the drawing), the cathode circuit impendance will again vary which will effect another change in the oscillator frequency. By making this resistor variable, it will now be apparent that the operating frequency of the oscillator may be altered merely by varying the value of this resistor. Thus, the oscillator frequency may be deviated by changing the cathode circuit impedance, and this deviation may be of frequency modulating character if such resistance variation is suitably rapid.

By replacing this variable resistor with the diode 19 as shown in the drawing, automatically resistance-varying arrangement is provided. This is true since the diode resistance varies in accordance with the amplitude of a current passing through it.

With no signal applied to the input terminal 20 and 21, the voltage across the diode will reverse in polarity at a rate determined by the frequency of oscillation. If a D.C. voltage is applied to these terminals, it will either aid or oppose the voltage current through the diode depending upon the polarity chosen. For example, if such polarity applies the negative side of the D.C. signal to ground, the net effect will be to decrease the average current through the diode thereby raising the resistance of the latter and causing the frequency of the oscillator to rise correspondingly above its nominal value. Similarly, reversing the polarity will serve to reverse the conductivity characteristic of the diode which is followed by a decrease in the frequency of oscillation below its nominal value.

This phenomenon is utilized by applying an A.C. modulating signal of suitable frequency and amplitude to the terminals 20 and 21 which in effect causes deviation of the oscillator frequency as though the aforementioned D. C. signal were being constantly alternated in polarity.

The diode 19 possesses resistivity characteristics which are dependent upon the amplitude of the current. The conventional 1N39 crystal diode will change in resistance characteristics sufficiently to provide an oscillator frequency deviation of from 0 to ±200 kc. with 0 to 3 ma. through the diode. By varying the amplitude of the modulating signal, it is, therefore, seen that the oscillator deviation may be correspondingly changed.

An important advantage residing in this invention is the fact that no noticeable decrease in power output or deleterious effects on oscillator frequency results. These operating features are of appreciable significance, since they provide a method of modulating directly a simple oscillator having its nominal operating frequency in the ultra-high frequency spectrum.

In actual practice, modulating signals as high as 200 kc. have been applied giving faithful reproduction of the signal at a deviation ratio of 1:1. Correspondingly much higher deviation ratios are possible if the modulating signal falls within the audio range. For example, if the modulating signal is 10 kc. and the deviation obtained from passing 3 ma. of this signal through the 1N39 diode is ±200 kc., the deviation ratio would be 20 to 1 insuring, to all intents and purposes, that all of the power transmitted will be in the side bands as desired.

Suitable circuit specifications, which are not intended to limit the scope of this invention, are given in the following by way of example. Other suitable circuit arrangements and values of component parts may be used without departing from the scope of this invention.

| | |
|---|---|
| Tubes **2** and **3** | Type 5876 pencil triode. |
| Resistor **13***a* | 800 ohms. |
| Inductors **16** and **17** | 10 turns #18 wire. |
| Condenser **18** | 1 μμf. |
| Diode **19** | Type 1N39. |

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A system providing frequency modulated signals comprising a push-pull oscillation generator having two electron discharge devices, each device including anode, cathode and control grid electrodes, an inductive reactance connected between said cathode electrodes, and a crystal diode connected in circuit with said inductive reactance for varying the impedance between said cathodes whereby the frequency of said generator may be varied, said diode correspondingly varying in impedance in response to a varying-amplitude modulating signal applied thereto.

2. A system providing frequency modulated signals comprising a push-pull oscillation generator having two electron discharge devices, each device including anode, cathode and control grid electrodes, an inductive reactance connected between said cathodes, and a network also connected between said cathodes and comprising a capacitive reactance and a crystal diode connected in series, said diode varying in its electrical characteristics in response to a varying-amplitude modulating signal applied thereto whereby the frequency of said generator is varied.

3. A system providing frequency modulated signals comprising a push-pull oscillation generator having two electron discharge devices, each device including anode, cathode and control grid electrodes, said generator being a tuned plate-tuned grid push-pull parallel line oscillator which includes two inductors respectively connected between ground and the respective cathodes, a frequency-deviating network connected between both cathodes and comprising a crystal diode and a condenser connected in series, said diode varying in conductivity in response to a varying-amplitude modulating signal applied thereto, and modulating-signal terminal means for applying a modulating signal between ground and the junction of said diode and said condenser.

References Cited in the file of this patent

UNITED STATES PATENTS

| | | |
|---|---|---|
| 2,407,860 | Wolf | Sept. 17, 1946 |
| 2,502,647 | Goddard | Apr. 4, 1950 |
| 2,537,065 | Lester et al. | Jan. 9, 1951 |
| 2,579,590 | Lenehan | Dec. 25, 1951 |
| 2,701,311 | Gray | Feb. 1, 1955 |